(12) United States Patent
Morris et al.

(10) Patent No.: US 11,939,050 B2
(45) Date of Patent: *Mar. 26, 2024

(54) AUTONOMOUS THRUST VECTORING RING WING POD

(71) Applicant: Textron Innovations Inc., Providence, RI (US)

(72) Inventors: Kevin Morris, Hawkesbury (CA); Nicholas Brodeur, Beaconsfield (CA); Carlos Fenny, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/446,782

(22) Filed: Sep. 2, 2021

(65) Prior Publication Data
US 2022/0048618 A1    Feb. 17, 2022

Related U.S. Application Data

(63) Continuation of application No. 16/183,899, filed on Nov. 8, 2018, now Pat. No. 11,130,568.

(51) Int. Cl.
*B64C 29/00*       (2006.01)
*B64C 11/00*       (2006.01)
(Continued)

(52) U.S. Cl.
CPC ........ *B64C 29/0033* (2013.01); *B64C 11/001* (2013.01); *B64C 11/46* (2013.01);
(Continued)

(58) Field of Classification Search
CPC ....... B64C 11/001; B64C 11/46; B64C 15/12; B64C 27/20; B64C 29/0033; B64C 39/06; B64C 39/062
See application file for complete search history.

(56) References Cited

U.S. PATENT DOCUMENTS 3,231,221 A    1/1966  Platt
5,810,288 A    9/1998  Sager
(Continued)

FOREIGN PATENT DOCUMENTS

CA    3061109 A1    5/2020
CH     711721 A2    5/2017
(Continued)

OTHER PUBLICATIONS

Canadian Intellectual Property Office; Canadian Office Action; Application No. 3,061, 109; Mar. 23, 2021; 4 pages.

*Primary Examiner* — Joseph W Sanderson
(74) *Attorney, Agent, or Firm* — Whitaker Chalk Swindle & Schwarz, PLLC; Enrique Sanchez, Jr.; Juan Vasquez

(57) ABSTRACT

An autonomous thrust vectoring ring wing pod is disclosed. A plurality of distributed propulsion element (thruster) layout within a self-articulating ring wing pod allows the pod to selectively control its thrust vector by controlling each propulsion element in the pod. This arrangement allows autonomous and independent control of the tilting of the ring wing relative to the aircraft. The ring wing pod acts as both a nacelle to house the propulsion elements as well as a lifting surface when in wing-borne flight. The autonomous thrust vectoring ring wing pod also provides superior aircraft attitude control in wing-borne flight, thus negating the need for conventional surface controls.

21 Claims, 6 Drawing Sheets

(51) Int. Cl.
*B64C 11/46* (2006.01)
*B64U 10/20* (2023.01)
*B64U 30/297* (2023.01)
*B64U 50/14* (2023.01)
*B64U 50/19* (2023.01)

(52) U.S. Cl.
CPC ........... *B64U 10/20* (2023.01); *B64U 30/297* (2023.01); *B64U 50/14* (2023.01); *B64U 50/19* (2023.01)

(56) References Cited

U.S. PATENT DOCUMENTS

| | | | |
|---|---|---|---|
| 5,810,289 | A | 9/1998 | Sager |
| 6,988,868 | B2 | 1/2006 | Ashworth |
| 8,262,016 | B2 | 9/2012 | Gosling |
| 8,733,690 | B2 | 5/2014 | Bevirt et al. |
| 9,694,908 | B2 | 7/2017 | Razroev |
| D796,414 | S | 9/2017 | Fenny et al. |
| D798,794 | S | 10/2017 | Fenny et al. |
| D798,795 | S | 10/2017 | Fenny et al. |
| 10,245,500 | B2 | 4/2019 | Chen |
| 10,252,796 | B2 | 4/2019 | Reichert |
| 10,252,797 | B2 | 4/2019 | Vondrell et al. |
| 10,399,673 | B1 | 9/2019 | Roop |
| 10,435,176 | B2 | 10/2019 | McClure et al. |
| 10,501,193 | B2 | 12/2019 | Oldroyd et al. |
| 10,513,334 | B2 | 12/2019 | Groninga et al. |
| 10,518,880 | B2 | 12/2019 | Kimchi et al. |
| 10,604,237 | B2 | 3/2020 | Voss |
| 10,730,624 | B2 | 8/2020 | Fenny et al. |
| 10,737,786 | B2 | 8/2020 | Fenny et al. |
| 10,800,521 | B1 | 10/2020 | Grenier et al. |
| 10,850,835 | B2 * | 12/2020 | Hutson .................. B64C 39/10 |
| 11,130,568 | B2 * | 9/2021 | Morris .................. B64U 30/20 |
| 11,485,489 | B2 * | 11/2022 | Kisly .................... B64C 3/20 |
| 2004/0240998 | A1 | 12/2004 | Ashworth |
| 2009/0084890 | A1 | 4/2009 | Reinhardt |
| 2010/0044496 | A1 | 2/2010 | Gosling |
| 2011/0042509 | A1 | 2/2011 | Bevirt et al. |
| 2011/0042510 | A1 | 2/2011 | Bevirt et al. |
| 2011/0186679 | A1 | 8/2011 | Reckzeh |
| 2014/0124613 | A1 | 5/2014 | Yang |
| 2015/0314867 | A1 | 11/2015 | Razroev |
| 2018/0002026 | A1 | 1/2018 | Oldroyd et al. |
| 2018/0044011 | A1 | 2/2018 | Reichert |
| 2018/0065741 | A1 | 3/2018 | Vondrell et al. |
| 2018/0208296 | A1 | 7/2018 | Mores et al. |
| 2018/0208305 | A1 | 7/2018 | Lloyd et al. |
| 2018/0215465 | A1 | 8/2018 | Renteria |
| 2018/0229839 | A1 | 8/2018 | Kimchi et al. |
| 2018/0281941 | A1 | 10/2018 | Hutson |
| 2018/0354615 | A1 | 12/2018 | Groninga et al. |
| 2019/0193839 | A1 | 6/2019 | Voss |
| 2020/0010182 | A1 | 1/2020 | Renteria |

FOREIGN PATENT DOCUMENTS

| | | |
|---|---|---|
| WO | 2017037311 A1 | 3/2017 |
| WO | 2017131834 A2 | 8/2017 |

\* cited by examiner

AUTONOMOUS THRUST VECTORING RING WING POD

CROSS-REFERENCE TO RELATED APPLICATIONS

The present application is a Continuation of U.S. patent application Ser. No. 16/183,899, filed Nov. 8, 2018, the entirety of which is herein incorporated by reference for all purposes.

BACKGROUND

1. Field of the Invention

The present invention is generally related to tiltrotor aircraft, and specifically to tiltrotor thrusters that articulate orientation without the use of an actuator.

2. Background of the Invention and Description of Related Art

Traditional tiltrotor aircraft are utilized in situations in which vertical take-off and landing of the aircraft is desired. The thrusters of such aircraft are oriented vertically to provide vertical lift. Once in the air, the thrusters of the aircraft articulate from a vertical to a horizontal position via an actuator to facilitate forward flight. Traditionally, aircraft with tilting rotors, ducted fans, or thrusting elements have utilized nacelle actuators in order change the angle of the thrust element relative to the wing/airframe. These systems, though robust, have inherent disadvantages in weight and bandwidth. The actuators can be heavy limiting the flight capabilities of the aircraft and inefficient in adjusting the orientation of the thrusters in response to real-time conditions, with a limited range of operation. Additionally, attitude authority in wing-borne flight is normally achieved through traditional control surfaces.

Additionally, traditional thrusters typically have a single fan, propeller, or engine that provide thrust orthogonal to the thruster. Vanes can be introduced to generally direct thrust, but come at an added complexity and cost to the aircraft. Vanes are also heavy, further limiting the capabilities of the aircraft. Further, the thrust angles are limited to the orientation and number of vanes provided.

SUMMARY

The present disclosure teaches technical advantages as an autonomous thrust vectoring ring wing pod. Thrust vectoring is the ability of a vehicle, such as an aircraft, to manipulate the direction of the thrust from its propellers, engines, or motors, to control the attitude or angular velocity of the vehicle. A plurality of distributed propulsion element (thruster) layout within a self-articulating ring wing pod allows the pod to selectively control its thrust vector by controlling each propulsion element in the pod. This unique feature allows autonomous and independent control of the tilting ring wing relative to the aircraft. The ring wing pod acts as both a nacelle to house the propulsion elements as well as a lifting surface when in wing-borne flight. The autonomous thrust vectoring ring wing pod also provides superior aircraft attitude control in wing-borne flight, thus negating the need for conventional surface controls.

A distributed propulsion ring wing pod is utilized in place of a conventional, mechanically articulated thruster/nacelle. The ring wing element no longer requires a traditional actuator to change trust angle because it can be suspended off of the airframe or wing by a rotating support element. The rotating support element can be a powered slip ring, shared shaft, or a bearing. The ring wing angle relative to the aircraft is controlled by the distributed propulsion within the ring wing itself. The aircraft can have a layout of any number of these distributed propulsion ring wing pods. Because each pod is autonomous, greater aircraft attitude control is achieved in both helicopter and airplane modes. The ring wing pod can be any shape, including square, circular, rectangular, diamond, etc., and can comprise of any number of thrusters. The propellers can be fixed or variable pitch (passive or active). Alternatives such as a ducted fans or jets could also be utilized in place of a propeller. The propeller can be a pusher- or puller-type and can be any in- or out-of-plane combination.

The structure that supports the distributed propulsive elements can be a lifting surface and can be horizontal, "X"-shaped, or other variations, whichever is deemed best suited for the particular aircraft configuration or application. The propellers can also be mounted on open wing surface shapes such as a "T"-section or crucifix. The propulsion elements can be canted within the ring wing to help augment hover control. The propellers in the ring wing pod can be driven in the same rotational direction or driven in counter rotating directions. This gives the ability to control and even cancel-out propeller torques within the ring wing without affecting total assembly lift thrust. The flight control computer may be centralized in the fuselage, local to each thrust pod, or a shared combination thereof. Similarly, the power sources can be centralized in the fuselage or integrated within each ring wing pod. The aircraft configuration can range from a traditional fixed wing layout to a flying "box."

Each of the ring wing pods can include a plurality of rotors that can be selectively controlled to articulate the thrust pod to a desired orientation. Once in the desired position, the rotors are further configured to create propulsion for the aircraft. The self-articulating thrust pod disclosed is better situated to quickly articulate positions, and has a greater bandwidth than actuators traditionally used to articulate aircraft thrusters. Further, the disclosure reduces redundancy, as the rotors used to provide thrust for the aircraft are also the rotors used to articulate the orientation of the thrust pod, rather than having an entirely different assembly such as an actuator for articulating the thrust pod.

Accordingly, one embodiment of the present disclosure includes an autonomous ring wing pod, comprising: a duct having an annular body, the duct rotatably coupled to an airframe structure such that the duct is rotatable about a rotation axis; a plurality of thrusters disposed within the duct, each thruster configured to provide a variable thrust output; and a controller configured to control the orientation of the duct by selectively varying the thrust output of each thruster to rotate the duct about the rotation axis. The plurality of thrusters can generate a pod thrust vector, wherein the pod thrust vector is determined by varying the thrust output of each of the plurality of thrusters. The plurality of thrusters can rotate in a first rotational direction and a second rotational direction. A first group of the plurality of thrusters rotate in a first rotational direction and a second group of the plurality of thrusters rotate in a second rotational direction. The first group of the plurality of thrusters rotate in the first rotational direction and the second group of the plurality of thrusters rotate in the second rotational direction to rotate the pod about the rotation axis. A voltage can be supplied to each of the plurality of thrusters and varied in magnitude. The voltage supplied to each of the plurality of thrusters can be selectively varied to generate a pod thrust vector. The voltage supplied to each of the plurality of thrusters can also be selectively varied to rotate the pod about the rotation axis. The controller can vary the voltage supplied to each of the plurality of thrusters. The plurality of thrusters are operably coupled to a support member disposed within the duct. The annular body can be circular, rectangular, triangular, or any suitable shape.

In another embodiment of the disclosure, an aircraft thrust system can include: an airframe structure; a plurality of ring wing pods operably coupled to the airframe structure and configured to provide thrust for an aircraft, each ring wing pod comprising: a duct having an annular body, the duct rotatably coupled to the airframe structure such that the duct is rotatable about a rotation axis; and a plurality of thrusters disposed within the duct, each thruster configured to provide a variable thrust output, wherein the plurality of thrusters generate a pod thrust vector determined by varying the thrust output of each of the plurality of thrusters. A controller can be disposed in each of the plurality of pods and configured to control the orientation of the pod by selectively varying the thrust output of each thruster. A flight controller can be configured to communicate with the plurality of controllers. The flight controller can wirelessly communicate with the plurality of controllers. Each of the plurality of controllers can be configured to communicate with each other. The pods can also be releasably, rotatably coupled to the airframe structure.

DETAILED DESCRIPTION

The preferred version of the inventions presented in the following written description and the various features and advantageous details thereof are explained more fully with reference to the non-limiting examples included in the accompanying drawings and as detailed in the description which follows. Descriptions of well-known components are omitted so as to not unnecessarily obscure the principle features of the invention as described herein. The examples used in the following description are intended to facilitate an understanding of the ways in which the invention can be practiced and to further enable those skilled in the art to practice the invention. Accordingly, these examples should not be construed as limiting the scope of the claimed invention.

Figure 1:
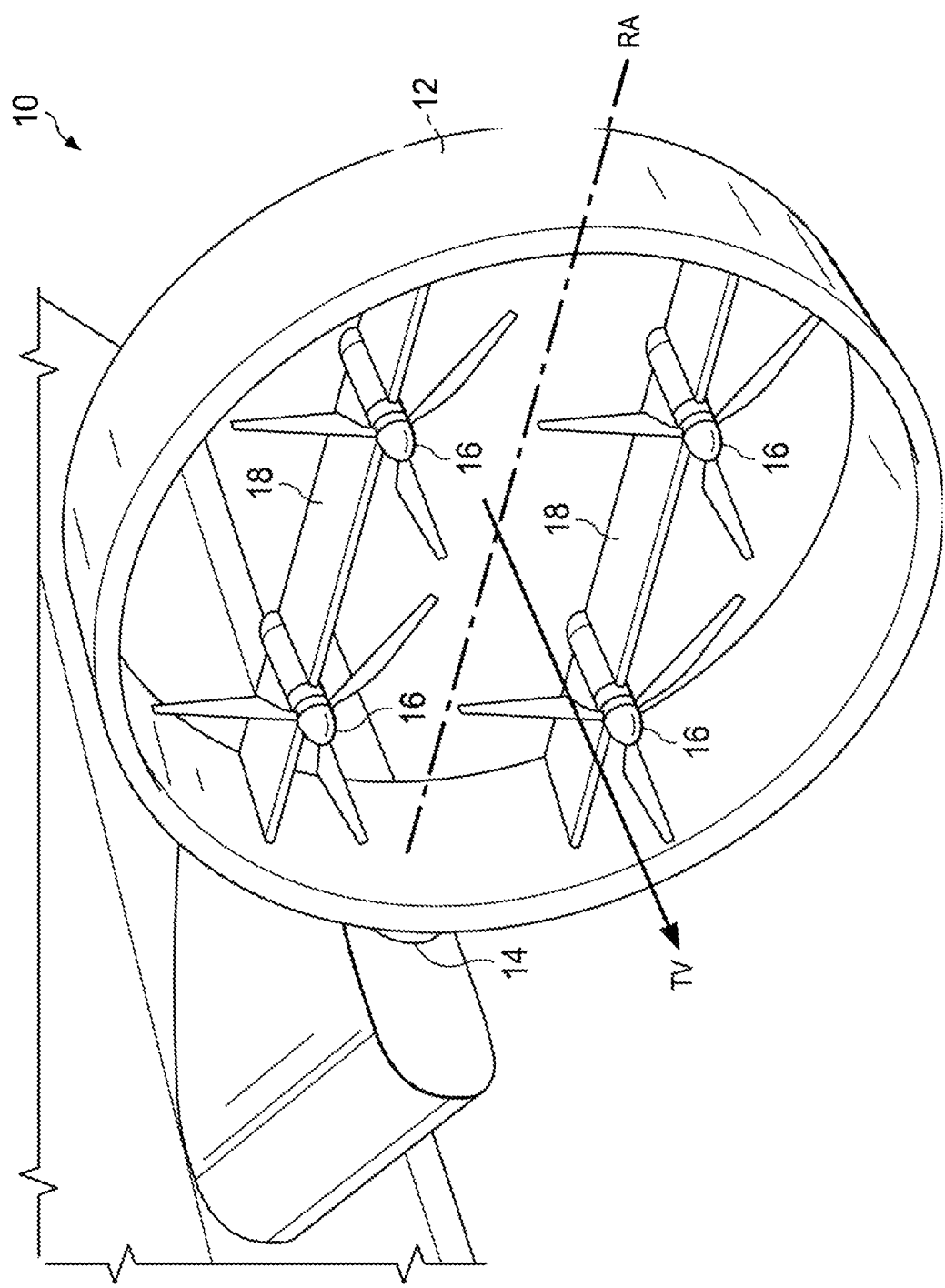
FIG. 1 is a perspective view of a ring wing pod, in accordance with an embodiment of the present disclosure.

FIG. 1 is a perspective view of a ring wing pod, designated generally as 10, in accordance with an embodiment of the present disclosure. A ring wing pod 10 can include a duct 12. The duct 12 is preferably a rigid material, such as metal, aluminum, carbon fiber, plastic, or other suitable material. The duct 12 can be an annular body, and the embodiment disclosed in FIG. 1 can be circular in shape. However, the annular duct 12 can be rectangular, triangular, octagonal, diamond shaped, or otherwise suitable shaped. The annular duct 12 also includes an opening at its center, wherein a plurality of thrusters 16 can be disposed. The ring wing pod 10 can utilize the annular duct 12 to create lift (as with a wing or airfoil).

As explained in greater detail below, the ring wing pod 10 can be configured to provide thrust in a desired direction. Thus, a thrust vector TV can be defined as a vector through the opening of the annular body of the duct 12. The thrust vector TV is the direction of thrust produced by the ring wing pod 10. The thrust vector TV is a resultant vector of the thrust created by a plurality of thrusters 16 mounted within the duct 12.

The duct 12 can be rotatably coupled to an airframe structure with a rotating support member 14. A rotation axis RA is defined orthogonally to the coupling point of the duct 12 to the airframe structure. Advantageously, the ring wing pod 10 can preferably freely rotate around the rotation axis RA. Alternatively, motion stops can be disposed to the airframe structure or the ring wing pod 10 to limit the rotation angle of the ring wing pod 10 around the rotation axis RA. The rotating support member can be a powered slip ring, shared shaft, bearing, or other suitable device, such that the duct 12 is capable of rotating about the rotation axis RA via the rotating support member 14. The duct 12 is rotatable around the rotation axis RA such that the duct 12 can have a plurality of orientations. The ring wing pod 10 can also be releasably, rotatably coupled to the airframe structure, such that the ring wing pod can attach or detach from the airframe structure. The airframe structure can be a fuselage, a wing, a support member, a container, or other suitable structure.

The ring wing pod 10 preferably includes a plurality of thrusters 16 configured for generating thrust. The thrusters 16 can be rotors, propellers, jet engines, or other suitable thrust generating device. Each thruster 16 has a thrust output. The thrusters 16 can be mounted to the inside of the duct 12 via one or more support members 18. In a preferred embodiment, two support members 18 each span the interior of the opening of the duct 12, with two thrusters 16 securably coupled to one of the support members 18. Alternatively, the support members 18 can be stators or any structure that mounts the plurality of thrusters 16 within the duct 12. While four thrusters 16 are shown in FIG. 1, any number of rotors can be mounted within the duct 12 without deviating from this disclosure. Any number of thrusters 16, greater than two, can be disposed within the ring wing pod 10, to generate steerable thrust. The thrusters 16 can also be mounted onto open wing surface shapes, including a "T"-section or "crucifix" configuration. The thrusters 16 are preferably disposed perpendicularly to the plane through the circumference of the ring wing pod 10. However, the thrusters 16 can also be canted within the ring wing pod 10 such that each thruster 16 can have a different pitch angles. Advantageously, different pitch angles can augment hover control and yield other desirable properties, including adjustment of the angle and magnitude of the resultant thrust vector TV. The plurality of thrusters 16 within the duct 12 can also have different propeller sizes and different propeller pitch angles from the other plurality of rotors mounted in the duct. The thrusters 16 can be configured so the thrust output produced by each of the thrusters 16 is in-line with the axis through each respective thruster 16.

In one embodiment the plurality of thrusters 16 are configured such that a first group of the plurality of thrusters 16 spin in one rotational direction (e.g., clockwise) while a second group of the plurality of thrusters 16 spin in a second rotational direction (e.g., counterclockwise). Such an arrangement allows for the counteraction of torque between the thrusters 16 in the pod 10 so that the pod 10 can rotate about the rotation axis RA. In another embodiment, all of the plurality of thrusters 16 within the pod 10 spin in the same rotational direction, maximizing the pod thrust.

In one embodiment, the plurality of thrusters 16 within the pod 10 can be configured to be pusher rotors. In another embodiment, the plurality of thrusters 16 can be puller rotors. In another embodiment, there can be a number of the plurality of thrusters 16 configured to be pusher rotors while the remaining number of the plurality or rotors are configured to be puller rotors. Additionally, one, a number, or all of the plurality of thrusters 16 within the pod 10 can be configured to adjust between being a pusher rotor and a puller rotor. The plurality of thrusters 16 can be configured on multiple support members 18, such that the plurality of thrusters 16 are on at least two different planes bisecting the duct 12. Such an arrangement allows for certain space saving and orientation properties. Alternatively, all of the thrusters 16 can be coupled to a single support member 18, such that the thrusters 16 are all on the same plane bisecting the duct 12.

As previously mentioned, the ring wing pod 10 differs from traditional articulating rotors in that it can be configured to self-articulate in different directions, and thereby change the orientation of the pod 10 and the thrust vector TV, without the use of an actuator. Referring to FIG. 1, and as previously described, duct 12 can be rotatably coupled to an airframe structure at a rotation axis RA via a rotating support member 14 at the rotation axis. In a preferred embodiment, the duct 12 is freely rotatable 360 degrees about the rotation axis RA via the rotating support member 14. In the preferred embodiment, the rotating support member 14 neither assists nor halts the rotation of duct 12 about the rotation axis RA. Instead, the duct 12 rotates about the rotation axis RA by using a controller selectively controlling the thrust output of the plurality of thrusters 16 mounted within the duct. However, in another embodiment, the rotating member 14 can only allow the duct 12 to rotate about the rotation axis RA within a certain angle range. In some embodiments, the rotation member 14 restricting the range that the duct 12 is able to rotate about the rotation axis is preferable for the control of the aircraft, as it keeps the duct from over rotating. Any method for restricting the rotation of the duct 12 is envisioned. In one embodiment, physical stoppers can be incorporated into the rotating member 14 to stop the duct 12 from rotating past certain points.

Each of the plurality of thrusters 16 can be selectively controllable by a controller. In one embodiment the controller can be a computer system. The computer system can include processors, input/output devices, communications links, and memory. In other embodiments, the computer system can include more, less, or other components. The computer system can be operable to perform one or more operations of various embodiments. Although the embodiment shown provides one example of the computer system that may be used with other embodiments, such other embodiments can utilize computers other than computer system. Additionally, embodiments can also employ multiple computer systems or other computers networked together in one or more public and/or private computer networks, such as one or more networks. The computer system can include a flight control computer.

Processors represent devices operable to execute logic contained within a medium. Examples of a processor include one or more microprocessors, field-programmable gate arrays (FPGAs), application specific integrated circuits (ASICs), one or more applications, and/or other logic. The computer system can include one or multiple processors or cores.

Input/output devices can include any device or interface operable to enable communication between the computer system and external components, including communication with a user or another system, such as the pod 10. Example input/output devices can include, but are not limited to, buses, USB ports, serial ports, displays, and other suitable devices. Further, examples of input/output devices can include anything typically used to control an aircraft, including but not limited to a control yoke, rudder pedals, and throttle controls. Further, examples of input/output devices can include anything typically used to control an unmanned aircraft such as a computer interface program, a remote controller, computer commands, etc.

Network interfaces can facilitate communication between the computer system and another element of a network, such as other computer systems or pods 10. Network interfaces may connect to any number and combination of wireline and/or wireless networks suitable for data transmission, including transmission of communications. Network interfaces can, for example, communicate audio and/or video signals, messages, internet protocol packets, frame relay frames, asynchronous transfer mode cells, and/or other suitable data between network elements. Network interfaces can connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

A memory can be any suitable storage mechanism and may store any data for use by the computer system. The memory can comprise one or more tangible, computer-readable, and/or computer-executable storage medium. Examples of the memory can include computer memory (e.g., Random Access Memory (RAM) or Read Only Memory (ROM)), mass storage media (e.g., a hard disk), removable storage media (e.g., a Compact Disk (CD), Digital Video Disk (DVD), or Blu-ray Disk), database and/or network storage (e.g., a server), and/or other computer-readable medium.

In some embodiments, the memory can store logic. Logic can facilitate operation of the computer system. Logic can also include hardware, software, and/or other logic. Logic can be encoded in one or more tangible, non-transitory media, and can perform operations when executed by a computer. Logic can include a computer program, software, computer executable instructions, and/or instructions capable of being executed by computer system. Example logic can include any of the well-known OS2, UNIX, Mac-OS, Linux, Windows, or Android Operating Systems, or other operating systems. In particular embodiments, the operations of the embodiments can be performed by one or more computer readable media storing, embodied with, and/or encoded with a computer program and/or having a stored and/or an encoded computer program. The logic can also be embedded within any other suitable medium without departing from the scope of the invention.

Various communications between computers or components of computers can occur across a network. The network can represent any number and combination of wireline and/or wireless networks suitable for data transmission. The network can, for example, communicate internet protocol packets, frame relay frames, asynchronous transfer mode cells, and/or other suitable data between network elements. The network can include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the preferred embodiment can include one network, more or fewer networks can be used and not all elements can communicate via the network. Teachings of certain embodiments also recognize that communications over a network is one example of a mechanism for communicating between parties, and any suitable mechanism may be used.

The controller can selectively control the thrust properties of each of the plurality of thrusters 16. For example, in one embodiment the controller is configured to increase or decrease the speed in rotation of each of the plurality of thrusters 16. By increasing the speed in rotation in a selected rotor 16 the controller is able to increase the amount of thrust that rotor is producing. By decreasing the speed in rotation in a selected rotor 16 the controller is able to decrease the thrust that rotor is producing. The controller can also vary the voltage supplied to each thruster 16 to vary the thrust output. The controller can be further configured to be able to adjust other properties of the plurality of the thrusters 16 as well. In one embodiment, where the thrusters 16 are propeller type rotors, the controller can be configured to alter the pitch angle of the propellers of the plurality of thrusters 16. By adjusting the pitch angle the thrust of each of the plurality of thrusters 16, the controller can adjust the thrust produced by each thruster 16. Additionally, by changing the pitch angles, the controller is configured to adjust the rotors between operating as pusher rotors and puller rotors. Further, the controller can be configured to change the rotational direction of each of the plurality of thrusters 16. For example, the controller can change the rotational direction of a rotor from clockwise to counter-clockwise.

Further, in one embodiment, the controller can be configured to selectively control the plurality of thrusters 16. As such, the controller is capable of adjusting each of the plurality of thrusters 16 in different ways simultaneously. For example, the controller could increase the thrust of a first selected group of the plurality of thrusters 16, while at the same time the controller could tell a second selected group of the plurality of rotors to decrease its thrust. The controller being selectively controllable over the plurality of rotors is what enables the duct 12 to rotate about the rotation axis RA at the rotating member 14.

Figure 2:
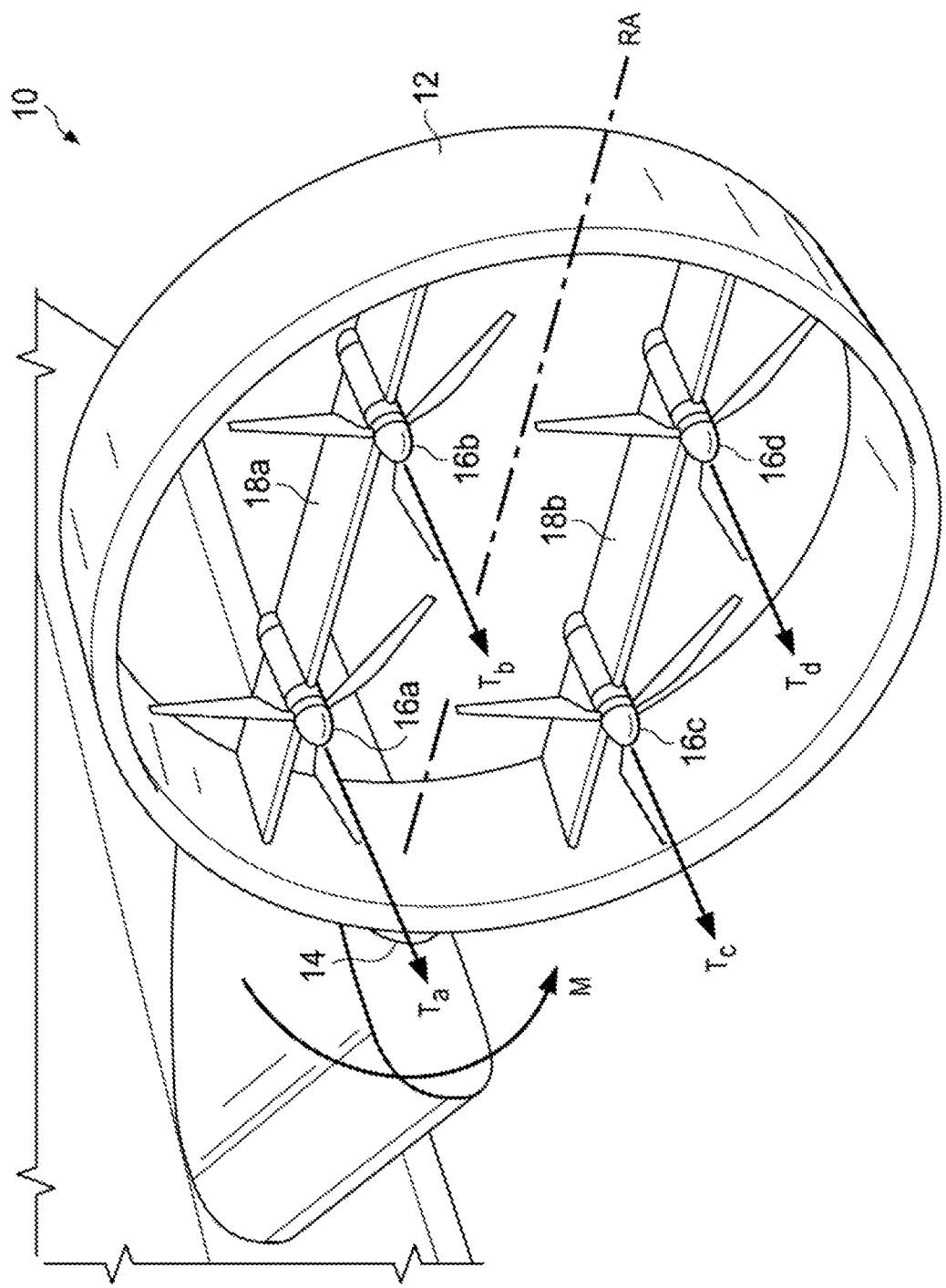
FIG. 2 is a perspective view of an articulating thrust pod with the corresponding forces and moments indicated, in accordance with an embodiment of the present disclosure.

Referring now to FIG. 2, the controller and thrusters 16 can be used to rotate the duct 12 about the rotation axis RA at the rotating member 14. In FIG. 2, an embodiment of the ring wing pod 10 is shown in which the pod 10 includes four thrusters $16_a$, $16_b$, $16_c$, $16_d$. Each of the four thrusters $16_a$, $16_b$, $16_c$, $16_d$, can be configured to create a thrust output $T_a$, $T_b$, $T_c$, $T_d$, respectively. As previously described, controller can be used to selectively control the amount of thrust output $T_a$, $T_b$, $T_c$, $T_d$, created by each of the four thrusters $16_a$, $16_b$, $16_c$, $16_d$. In one embodiment, the controller can configure the thrusters $16_a$, $16_b$, to create thrust values $T_a$ and $T_b$, greater than the thrust values $T_c$ and $T_d$, created by thrusters $16_c$, $16_d$. Accordingly, a greater thrust force can be experienced by support beam $18_a$ than by support member $18_b$, both support members connected to duct 12. Because of these uneven forces experienced by the duct 12, a moment M is created about the rotation axis RA at the rotation member 14. Because the duct can freely rotate about the rotation axis RA via the rotating member 14, as previously described, the duct rotates about the rotation axis RA because of the moment M and in the direction of the moment M. The pod 10 is effectively self-articulating because it can change its orientation, and therefore change the pod thrust vector TV direction and magnitude, without the use of an actuator or other articulation device. Although four thrusters have been shown, any number of thrusters 16, greater than two, can be incorporated into the ring wing pod 10.

The plurality of thrusters $16_a$, $16_b$, $16_c$, $16_d$, can be configured to create thrust output $T_a$, $T_b$, $T_c$, $T_d$, related to the orientation of the duct 12. In another embodiment, the thrusters $16_a$, $16_b$, $16_c$, $16_d$, can be arranged on the support beams $18_a$ and $18_b$ such that the thrusters can create thrust vectors $T_a$, $T_b$, $T_c$, $T_d$, at an angle canted to the orientation of the duct 12. In such a configuration, the thrusters $16_a$, $16_b$, $16_c$, $16_d$, can be installed on the support beams $18_a$ and $18_b$ at an angle canted to the orientation of the duct 12. Such an arrangement can be desirable, as the canted thrust vectors $T_a$, $T_b$, $T_c$, $T_d$, of the canted thrusters $16_a$, $16_b$, $16_c$, $16_d$, can adjust the angle of the resultant thrust vector TV with respect to the orientation of the duct 12.

Figure 3A:
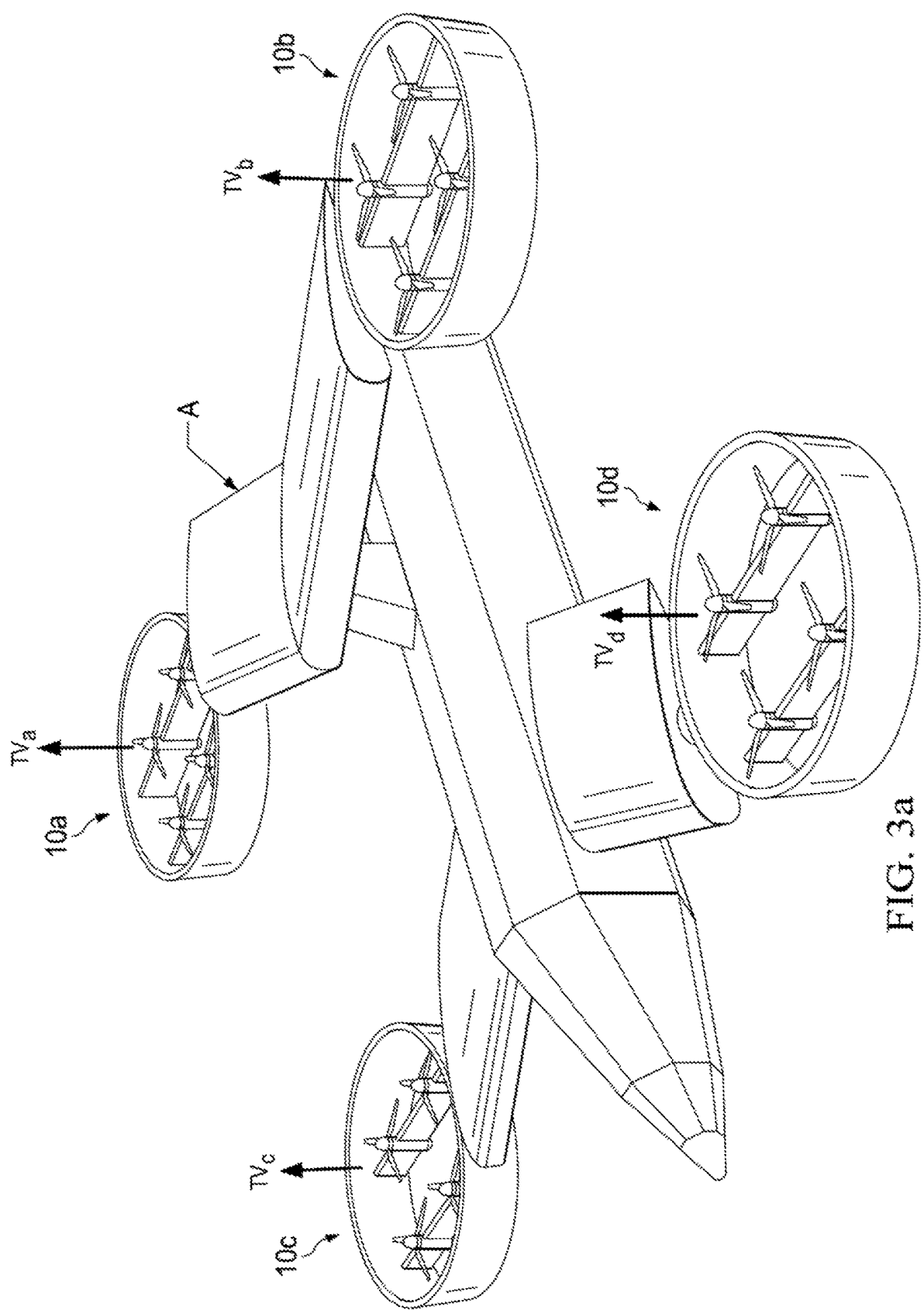
FIG. 3A is a perspective view of an aircraft having a thrust system including a plurality of articulating thrust pods configured to provide for vertical lift, in accordance with an embodiment of the present disclosure.

The desired orientation of the ring wing pod 10 becomes apparent when considering the pod 10 can be incorporated into an aircraft thrust system. Referring to FIG. 3A, four different thrust pods of this disclosure $10_a$, $10_b$, $10_c$, $10_d$, are shown incorporated into an aircraft A. In this embodiment, each thrust pod $10_a$, $10_b$, $10_c$, $10_d$, can be configured to have a vertical orientation such that the thrust vectors of the pods $TV_a$, $TV_b$, $TV_c$, $TV_d$, are vertical. In this orientation, the pods $10_a$, $10_b$, $10_c$, $10_d$, can be configured to provide vertical lift for the aircraft A. In this embodiment there can be one central controller controlling the rotors of each of the thrust pods $10_a$, $10_b$, $10_c$, $10_d$, or a different controller for each of the thrust pods without deviating from this disclosure, as described in greater detail below. Although four ring wing pods 10 have been shown, any number of ring wing pods 10 can be incorporated into the aircraft thrust system.

Figure 3B:
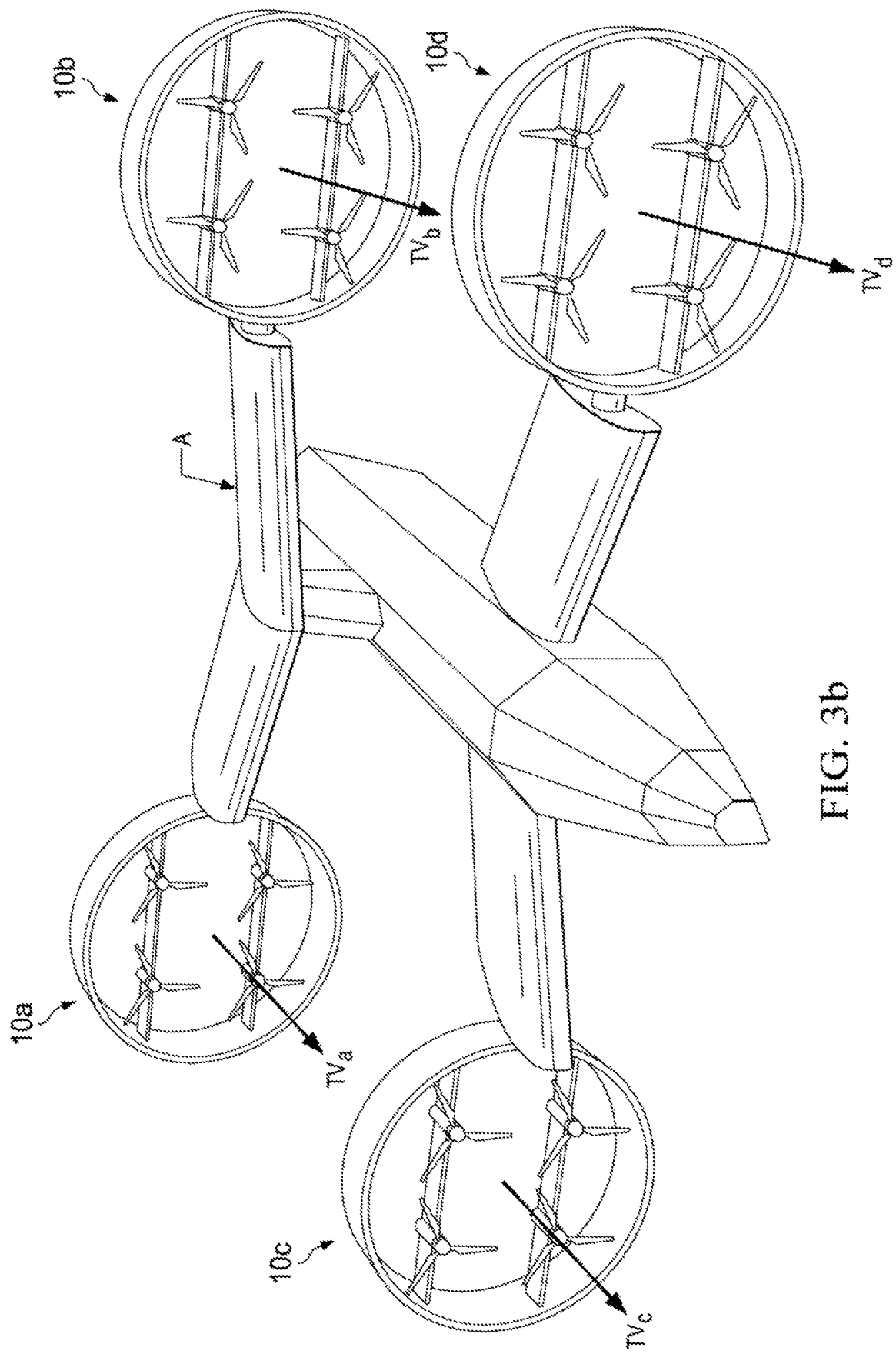
FIG. 3B is a perspective view of an aircraft having a thrust system including a plurality of articulating thrust pods configured to provide for horizontal propulsion, in accordance with an embodiment of the present disclosure.

As previously described, the controller can be configured to control the self-articulation of the pods $10_a$, $10_b$, $10_c$, $10_d$. Referring to FIG. 3B, in another embodiment, the controller can be configured to articulate the orientation of the pods $10_a$, $10_b$, $10_c$, $10_d$, to a horizontal orientation such that the thrust vectors of the pods $TV_a$, $TV_b$, $TV_c$, $TV_d$, are horizontal. In this orientation, the pods $10_a$, $10_b$, $10_c$, $10_d$, can be configured to provide horizontal thrust for the aircraft A in horizontal flight.

Due to the autonomous nature of the pod 10, various independent orientations of the pod 10 of an aircraft A exist.

Figure 3C:
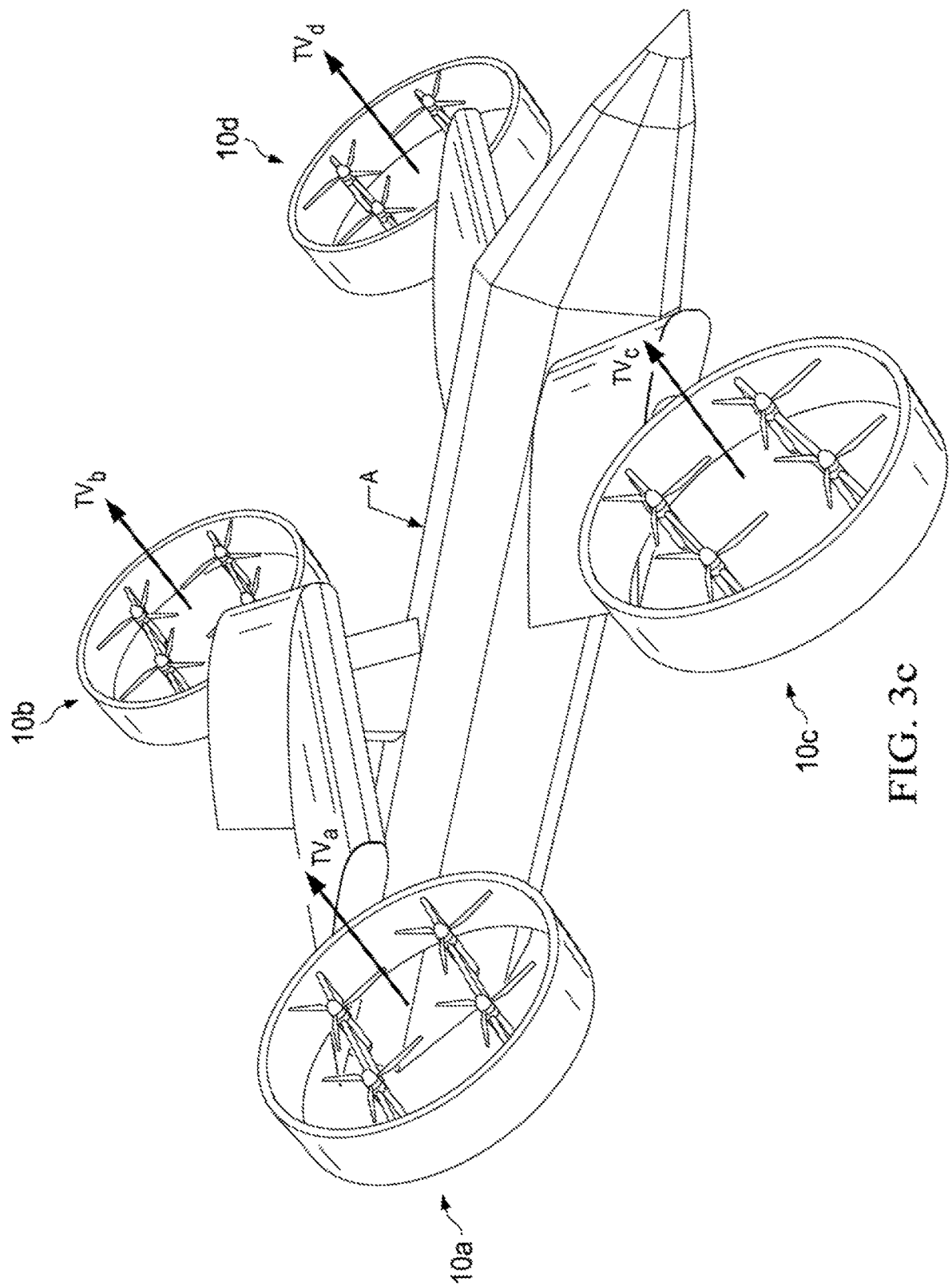
FIG. 3C is a perspective view of an aircraft having a thrust system including a plurality of articulating thrust pods configured to provide for angled lift, in accordance with an embodiment of the present disclosure.

Referring to FIG. 3C, in one embodiment, the pods $10_a$, $10_b$, $10_c$, $10_d$, can be configured such that the thrust vectors $TV_a$, $TV_b$, $TV_c$, $TV_d$, are at a non-orthogonal angle to the horizontal. Further, the pods 10 of an aircraft A do not all have to be in the same orientation and can each be in different orientations depending on the thrust vectors determined for each pod 10 by the controller. For example, it may be desired for each pod 10 to have a different orientation when turning, to stabilize position in certain crosswinds, to better hover in a certain position, etc.

Figure 3D:
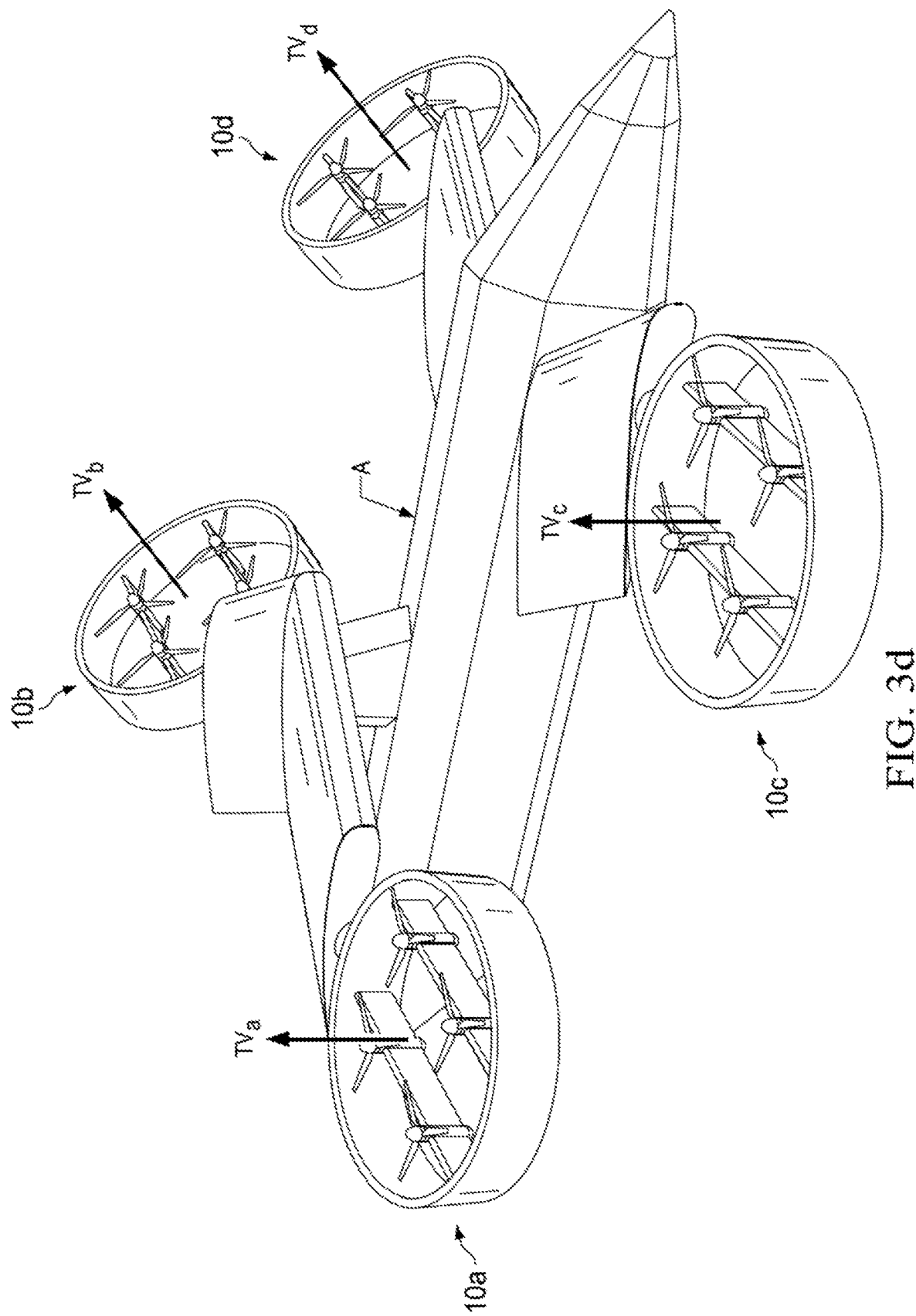
FIG. 3D is a perspective view of an aircraft having a thrust system including a plurality of articulating thrust pods configured to provide for varying lift about either side of the aircraft, in accordance with an embodiment of the present disclosure.

Referring to FIG. 3D, in one embodiment the pods $10_a$ and $10_c$, can be oriented to provide for vertical lift while pods $10_b$ and $10_d$ can be configured to have a titled orientation. Such an embodiment could be desirable when the aircraft A is configured to hover in a particular position while in a cross-wind, or to account for an obstacle.

The pod 10 is not limited to only providing thrust for the vertical or forward flight of an aircraft. The pod 10 can be configured to freely rotate about the rotation axis RA at the rotation member 14, the controller can self-articulate the pod in any desired position to obtain the desired thrust vector TV for the pod. The desired aircraft A orientation can determine the positioning of the pod 10. This could include an orientation of the pod 10 where the thrust vector TV is backward facing, thereby providing for backward directional flight. Further, this could include an orientation of the pod 10 where the thrust vector TV is downward facing, therefore assisting gravity in a downward trajectory of the aircraft.

In an aircraft thrust system in which there are a plurality of ring wing pods 10, a pod 10 in the thrust system can contain thrusters that rotate in a different rotational direction than the thrusters of another pod 10 in the thrust system. For example, referring to FIGS. 3A-3D, the rotors of thrust pods $10_a$ and $10_b$ can be configured to rotate in one rotational direction (e.g., clockwise) while the rotors of thrust pod $10_c$ and $10_d$ can be configured to rotate in a second rotational direction (e.g., counterclockwise). This arrangement allows for the rotors of the thrust system to counteract the torque experienced by the aircraft A from the plurality of thrust pods while in operation and maintain the aircraft A in a desired position.

In one embodiment the thrust system can be controlled by a common controller among the plurality of pods. Such a system can be described as a centralized control system. In one embodiment, the common controller can be a single flight control computer capable of controlling each of the plurality of thrusters 16 of each of the plurality of ring wing pods 10. The flight control computer can have the functionality and capabilities of the computer system described above. Referring to the thrust systems of FIGS. 3A-3D, the flight control computer can be configured to control each of the plurality of thrusters in pods $10_a$, $10_b$, $10_c$, and $10_d$. Thus, the flight control computer can coordinate the output thrust vectors $TV_a$, $TV_b$, $TV_c$, $TV_d$, in order to adjust the desired flight direction of the aircraft A, based on the inputs made by a flight operator. In one embodiment of the centralized control system, the plurality of thrusters 16 of the plurality of pods 10 can be configured to communicate with the controller via a hardwired communication line. In another embodiment of the centralized control system, the plurality of thrusters 16 of the plurality of pods 10 can be configured to wirelessly communicate with the controller.

Each of the plurality of ring wing pods 10 can have its own controller. Such a system can be described as a decentralized control system. In one embodiment, each of the controllers 20 used for controlling each pod 10 can be disposed in each pod 10. Each on-pod controller can be an on-pod flight control computer. The on-pod controllers 20 can have the functionality and capabilities of the computer system discussed above. In one embodiment of the decentralized system, each of the on-pod controllers 20 can be configured to communicate with the other on-pod flight controllers 20 to achieve the desired flight direction of aircraft A, based on the input 24 of a flight operator. In another embodiment of a decentralized control system, in addition to having a plurality of on-pod controllers 20, there is also an aircraft flight control computer, wherein the aircraft flight control computer can be configured to communicate with the plurality of on-pod controllers 20 in order to achieve the desired flight direction of the aircraft A, based on the input of a flight operator or other suitable input. The aircraft flight control computer having the functionality and capabilities of the computer system previously disclosed in greater detail.

In one embodiment of the decentralized control system, the plurality of thrusters 16 of the plurality of pods 10 can be configured to communicate with the on-pod controller controlling each respective pod 10 via a hardwired communication line. In another embodiment of the decentralized control system, the plurality of thrusters 16 of the plurality of pods 10 can be configured to wirelessly communicate with the on-pod controller. In one embodiment of the decentralized control system, the plurality of on-pod flight control computers can communicate with each other via a hardwired communication line. In one embodiment of the decentralized control system, the plurality of on-pod flight control computers are able to communicate with each other via wireless communication. In yet another embodiment of the decentralized control system, the plurality of on-pod flight control computers are able to communicate with the aircraft flight control computer via hardwired communication lines. In yet another embodiment of the decentralized control system, the plurality of on-pod flight control computers are able to communicate with the aircraft flight control computer via wireless communication.

The desired flight properties of the aircraft A can be given to the controllers 20 of either the centralized or decentralized systems by a flight operator or computer as input. In another embodiment the flight operator can be on-board the aircraft A as a pilot or computer. In another embodiment, the flight operator can provide input to the controller from a remote location. Such an embodiment can be desirable for pilot-less aircraft.

The present invention achieves at least the following advantages:
1. increased bandwidth;
2. increased redundancy;
3. removal of heavy tilting mechanisms; and
4. fine-grained thrust control.

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. For example, different thrusters and selective attachment or reattachment of ring-wing pods are all within the scope of the present disclosure. Further, the individual elements of the claims are not well-understood, routine, or conventional. Instead, the claims are directed to the unconventional inventive concept described in the specification.

What is claimed is:

1. An autonomous pod, comprising:
a rotation member configured to rotate freely about a rotation axis;
a support member operably coupled to the rotation member, wherein the support member includes a first support member disposed on a first plane and a second support member disposed on a second plane different from the first plane, wherein the first support member and the second support member are disposed within a ring wing pod;
a plurality of thrusters operably coupled to the support member, each thruster configured to provide a variable thrust output, wherein a first group of the plurality of thrusters is operably coupled to the first support member and a second group of the plurality of thrusters is operably coupled to the second support member; and
a controller configured to vary the thrust output of each thruster to rotate the support member about the rotation axis.

2. The autonomous pod of claim 1, wherein one or more of the plurality of thrusters are canted.

3. The autonomous pod of claim 2, wherein the canted thrusters are canted non-orthogonally to the support member.

4. The autonomous pod of claim 1, wherein each of the plurality of thrusters includes propellers configured to rotate in a first rotational direction and a second rotational direction about a rotation axis of each respective thruster of the plurality of thrusters.

5. The autonomous pod of claim 4, wherein a first group of the plurality of thrusters rotate in the first rotational direction and a second group of the plurality of thrusters rotate in the second rotational direction.

6. The autonomous pod of claim 5, wherein the first group of the plurality of thrusters rotate in the first rotational direction and the second group of the plurality of thrusters rotate in the second rotational direction to counteract the torque between the thrusters.

7. The autonomous pod of claim 1, wherein a voltage supplied to each of the plurality of thrusters can be varied.

8. The autonomous pod of claim 7, wherein the voltage supplied to each of the plurality of thrusters can be selectively varied to generate a thrust vector.

9. The autonomous pod of claim 8, wherein the voltage supplied to each of the plurality of thrusters can be selectively varied to rotate the rotation member about the rotation axis.

10. The autonomous pod of claim 7, wherein the controller can vary the voltage supplied to each of the plurality of thrusters.

11. The autonomous pod of claim 1, wherein each thruster of the plurality of thrusters is canted at a different angle such that each thruster has a different pitch angle.

12. A method of autonomously controlling the orientation of an aircraft, comprising:
operating a plurality of thrusters operably coupled to a support member of an aircraft, each thruster configured to provide a variable thrust output, wherein the support member includes a first support member disposed on a first plane and a second support member disposed on a second plane different from the first plane, wherein a first group of the plurality of thrusters is operably coupled to the first support member and a second group of the plurality of thrusters is operably coupled to the second support member;
varying, via a controller, the thrust output of each thruster to rotate the support member about a rotation axis using only the thrust output of each thruster; and
coordinating, via the controller, the thrust output for each of the plurality of thrusters to control the flight orientation of the aircraft.

13. The method of claim 12, wherein the controller can be a flight control computer.

14. The method of claim 12, wherein the controller includes a first controller configured to control a first group of thrusters, and a second controller configured to control a second group of thrusters.

15. The method of claim 14, wherein the first controller varies the thrust output of each thruster in the first group of thrusters and the second controller varies the thrust output of each thruster in the second group of thrusters.

16. The method of claim 14, wherein a flight controller communicates with the first and second controllers.

17. The method of claim 16, wherein the flight controller wirelessly communicates with the first and second controllers.

18. The method of claim 14, wherein the first and second controllers are configured to communicate with each other.

19. The method of claim 12, wherein one or more of the plurality of thrusters are canted.

20. The method of claim 19, wherein the canted thrusters can be canted non-orthogonally to the support member.

21. The method of claim 12, wherein each thruster of the plurality of thrusters is canted at a different angle such that each thruster has a different pitch angle.

* * * * *